July 30, 1957
H. E. BECK
2,801,030
FERTILIZER SPREADER
Filed Aug. 17, 1953
3 Sheets-Sheet 1
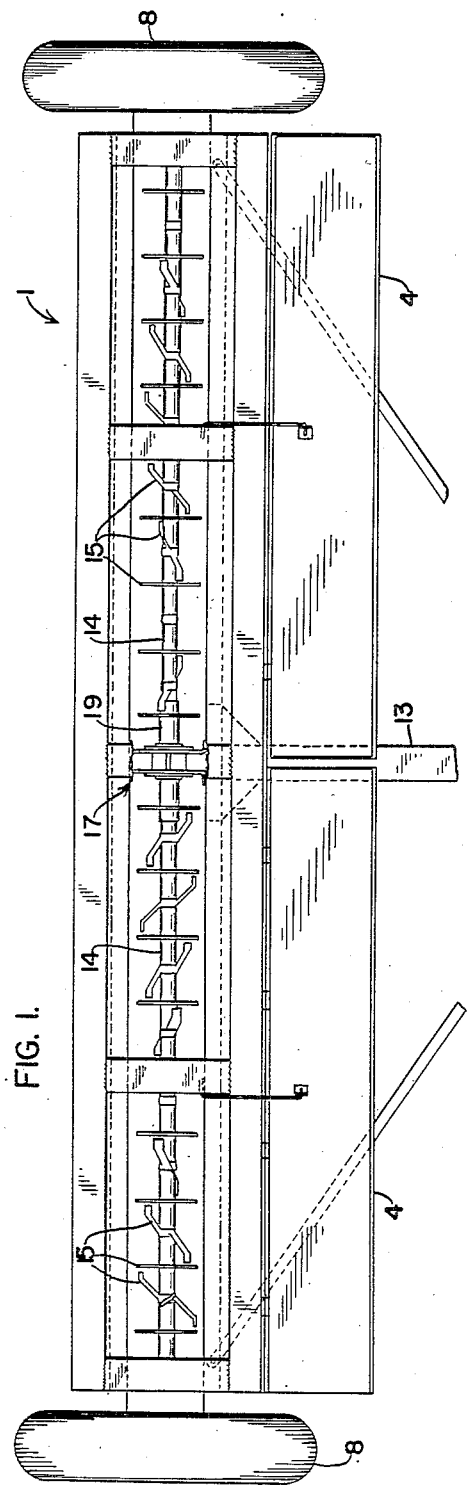
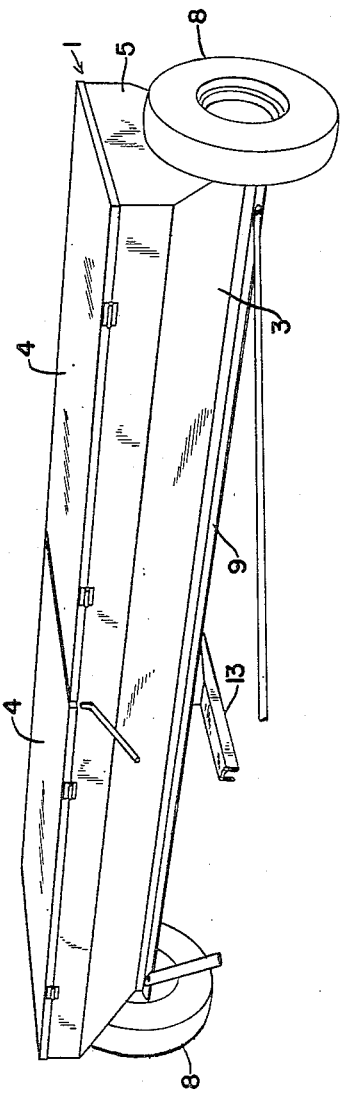
*INVENTOR.*
HENRY E. BECK
BY *Andrus & Sceales*
ATTORNEYS July 30, 1957  H. E. BECK  2,801,030
FERTILIZER SPREADER
Filed Aug. 17, 1953  3 Sheets-Sheet 2
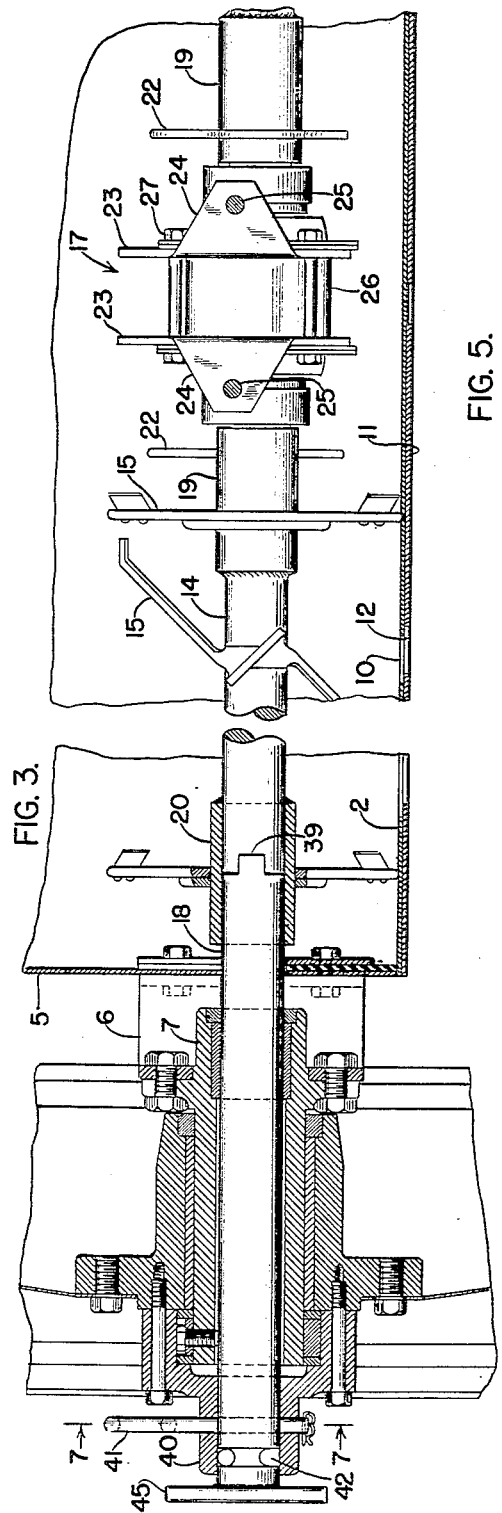
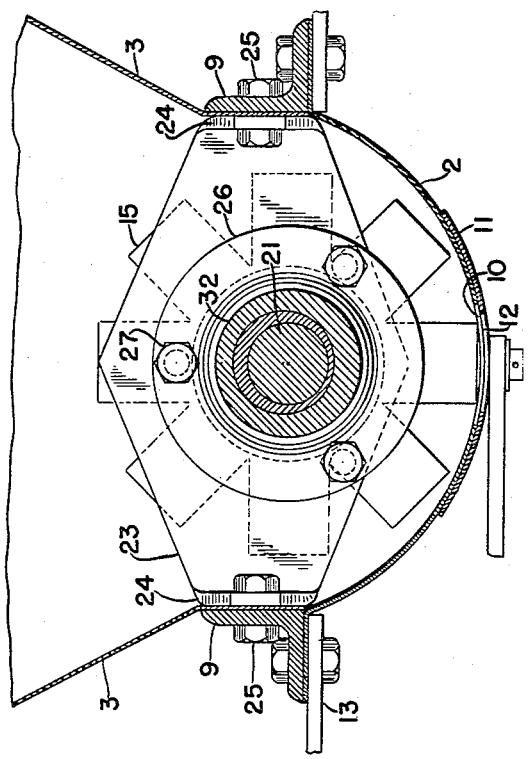
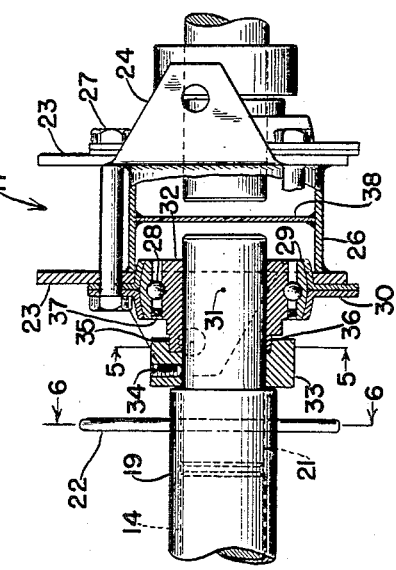
INVENTOR.
HENRY E. BECK
BY
ATTORNEYS July 30, 1957 H. E. BECK 2,801,030
FERTILIZER SPREADER
Filed Aug. 17, 1953 3 Sheets-Sheet 3
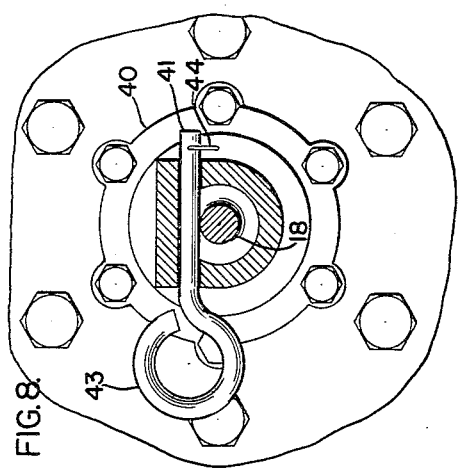
FIG. 8.
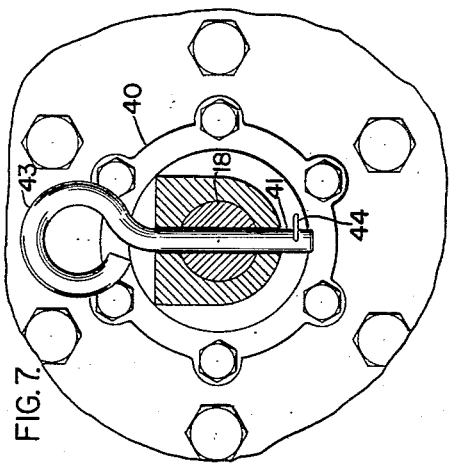
FIG. 7.
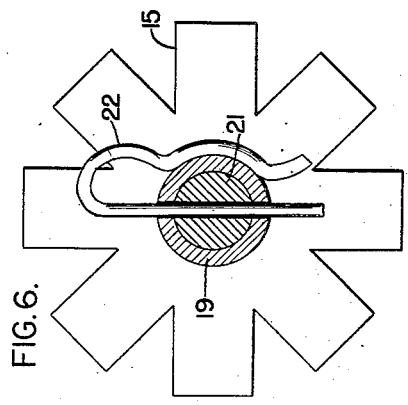
FIG. 6.
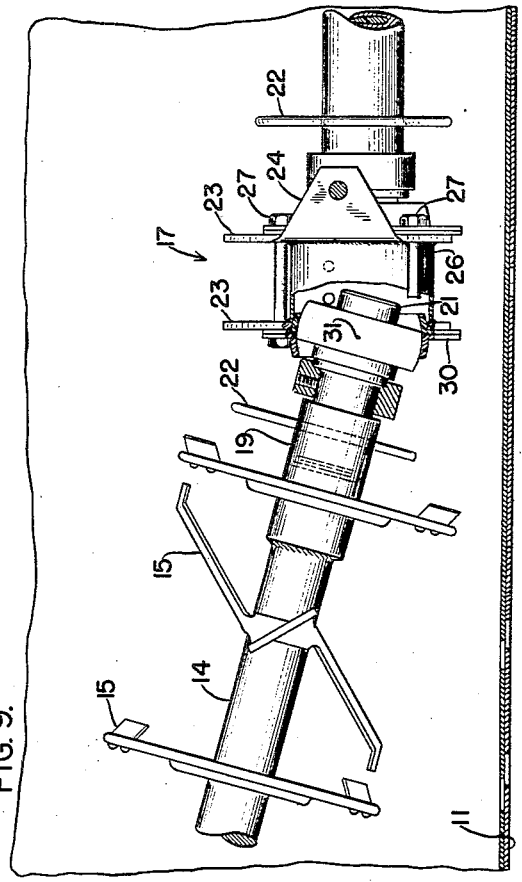
FIG. 9.
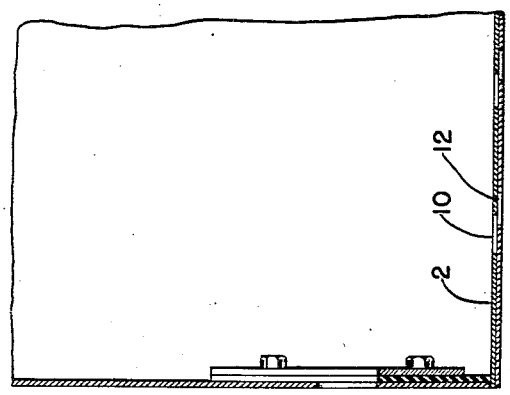
INVENTOR.
HENRY E. BECK
BY
ATTORNEYS

United States Patent Office 2,801,030
Patented July 30, 1957

2,801,030

FERTILIZER SPREADER

Henry E. Beck, Racine, Wis., assignor to J. I. Case Company, Racine, Wis., a company of Wisconsin Application August 17, 1953, Serial No. 374,521

13 Claims. (Cl. 222—177)

This invention relates to a fertilizer spreader wherein a rotary agitator is provided in the valley of the hopper and driven by the rotation of the wheels that support the hopper at the ends thereof.

Heretofore, spreaders of this type have employed sectional agitator shafts with the wheel at each end of the hopper driving a corresponding separate section of the shaft extending generally from the end of the wheel to the center of the hopper. The shaft sections have been separately removable for cleaning purposes, and means have been provided for clutching and unclutching the wheel from the corresponding shaft section to provide selective driving of the agitator.

In prior structures the shaft bearings at the center of the hopper were generally of the journal type submerged in the fertilizer, lime or other material being spread, and were extremely difficult to keep lubricated. Furthermore the shaft sections had to be axially removed from the journal bushings leaving the latter to become contaminated by loose fertilizer or lime which could not be cleaned therefrom adequately, except with extraordinary care, prior to the reassembly of the shaft sections.

Another difficulty with former constructions lies in the journal bearings for the stub shafts in the hollow hub of the wheel, whereby these bearings were also subjected to exposure to fertilizer or lime during disassembly of the shaft sections and next to impossible to clean for reassembly of the sections.

Furthermore, difficulty arose with journal bearings at both ends of the shaft due to misalignment and inaccuracies of mounting which resulted in undue wear of the bearings and which could not be corrected within a reasonable cost for the spreader.

The present invention overcomes the difficulties recited above, first by providing a sealed anti-friction bearing unit at the center of the hopper wherein the bearings are continuously run in oil in a sealed chamber and stub shafts extend through the corresponding bearings for attachment to the inner ends of the corresponding agitator shaft sections, and second, by disposing the journal bearing for the stub shaft in each hollow wheel hub spaced from and outside the end of the hopper whereby the inner end of the bearing is not subjected to the material being spread.

In addition to the above, the central bearings are made freely tiltable in the walls of the oil seal chamber whereby each section of the agitator shaft can be more readily removed without requiring axial movement in the bottom of the hopper where packed material often prevents adequate axial movement of the shaft of former constructions to release the same from the bearings. After the shaft section of the present invention is tilted upwardly, it is a simple matter to remove the section, or it may be cleaned in tilted position and then lowered again to operating position.

The tiltable inner bearings eliminate much of the difficulty of previously misaligned bearings and prevents binding of the shaft.

The selective drive connection between the wheel and the outer end of the stub shaft in the hollow wheel hub has been substantially simplified and strengthened over prior constructions.

The invention may be more readily understood by reference to the accompanying drawings and the following description of an embodiment of the best mode presently contemplated by applicant for carrying out the invention.

In the drawings:

Figure 1 is a top plan view of the fertilizer spreader showing the hinged hopper covers open;

Fig. 2 is a perspective view of the spreader and drawbar, without the spreader adjustment mechanism;

Fig. 3 is an enlarged broken vertical axial section through parts of the spreader and showing the central bearing in elevation and the wheel hub in section;

Fig. 4 is a still further enlarged detail elevation of the central bearing and adjacent shafts with parts in section;

Fig. 5 is a transverse vertical section taken on line 5—5 of Fig. 4;

Fig. 6 is a transverse vertical section taken on line 6—6 of Fig. 4;

Fig. 7 is an enlarged transverse vertical section taken through the wheel and shaft drive connection at the position of the drive pin, on line 7—7 of Fig. 3;

Fig. 8 is an enlarged transverse vertical section showing the drive pin in non-drive connection for the wheel and stub shaft; and Fig. 9 is a central longitudinal vertical section of one end of the hopper showing the shaft section in upward tilted position.

The embodiment of the invention illustrated is incorporated in a spreader comprising a box or hopper 1 of substantial length having a trough 2 extending longitudinally thereof and constituting the bottom, upwardly extending somewhat diverging front and rear hopper sides 3, and cover sections 4 hinged to one of the sides to close the hopper and provide for filling of the same as required with fertilizer, lime or other material.

The opposite ends 5 of the hopper close the same and carry channel brackets 6 to the outer web of each of which is secured a hollow hub 7 upon which a suitable rubber tired wheel 8 is rotatably mounted for supporting the hopper.

A rigid angle iron frame 9 extends longitudinally between bracket 6 along the juncture between the upper edges of trough 2 and the front and rear sides 3. The bottom of trough 2 has a series of longitudinally spaced openings 10 which are selectively adjusted in size by a curved plate 11 having corresponding openings 12 and which is adapted to be shifted longitudinally to adjust the size of the corresponding registering openings 10 and 12 for determining the rate of discharge of material from the hopper. The drawbar 13 is attached to frame 9 to pull the spreader over a field or the like.

An agitator shaft 14 is disposed in the trough 2 of hopper 1 and is made in two sections each extending for approximately one half the length of the hopper and carrying suitable angular blades 15 for agitating the material in the hopper as the shaft rotates. Since both sections of the agitator shaft 14 are alike in construction only one is shown in detail.

The shaft sections 14 are supported at their inner ends by a central bearing unit 17 secured in the trough 2 at the center of the hopper, and at their outer ends by corresponding stub drive shafts 18 journaled in the respective hollow hubs 17.

For this purpose a tubular sleeve 19 is welded over the inner end of each shaft section 14 and extends beyond the end of the shaft for a short distance. Similarly a tubular sleeve 20 is welded over the outer end of each shaft section 14 and extends beyond the end of the shaft for a short distance.

Sleeve 19 extends over the outer end of a stub shaft 21 protruding from the bearing unit 17 and the inner end of the shaft 14 is thereby supported by shaft 21 and bearing unit 17. Shafts 14 and 21 are coupled together to rotate in unison by means of the removable pin 22 which is shown in the general shape of a hair pin with one side straight to enter aligned openings in sleeve 19 and shaft 21, and the other side curved to resiliently engage the outer surface of sleeve 19 and secure the pin against dropping out during rotation of the shafts.

The bearing unit 17 comprises a pair of spaced cross plates 23 flanged at the ends 24 and secured by bolts 25 extending through the flanges, the corresponding walls of trough 2 and the angle iron frame 9.

The plates 23 are welded to the opposite ends of an intermediate cylindrical casing 26 by means of circumferentially spaced bolts 27 outside casing 26. The plates 23 are open at the center for a diameter generally corresponding to the inside diameter of casing 26.

An anti-friction ball bearing 28 is carried by each plate 23, the outer race 29 of the bearing being mounted in a curved flange member 30 secured to the plate 23 by the bolts 27. The curvature of member 30 is generally in the form of a segment of a sphere having the center 31 of its radius at the center of stub shaft 21 and lying in a transverse plane normal to shaft 21 and bisecting the member 30.

The inner race 32 is clamped upon stub shaft 21 by means of a collar 33 secured against rotation and axial displacement on the stub shaft by a set screw 34. The race 32 and collar 33 have overlapping eccentric flanges 35 and 36, respectively, which serve to effect the clamping of the bearing upon stub shaft 21 by relative rotation of the race and collar.

The construction described provides an anti-friction bearing 28 with the inner race 32 clamped tightly to stub shaft 21 to rotate therewith, and with the outer race mounted in a spherical bearing enabling the stub shaft 21 to be tilted angularly with respect to the unit so that the entire agitator shaft section 14 can be tilted upwardly about center 31 and with the outer end of the shaft section raised above hopper 1.

Each anti-friction bearing is adapted to run in grease and for this purpose an oil seal 37 is provided between races 29 and 32 near the outer edges thereof so that casing 26 can be filled with lubricant. A partition 38 extends transversely across the casing 26 centrally thereof to provide separate oil chambers for the corresponding bearings, and is welded to the casing about its periphery.

The outer end of each agitator shaft section 14 is carried by the corresponding drive shaft 18 which extends axially into the open end of sleeve 20. Driving connection is established between shaft 18 and shaft 14 by suitable clutch means illustrated as a tongue and groove clutch 39 interlocking the abutting ends of the shafts within sleeve 20.

Each drive shaft 18 extends outwardly through the corresponding hub 7 and means are provided to selectively drive shaft 18 from the corresponding wheel 8. For this purpose a cap 40 is bolted to the hub of wheel 8 and extends over the end of hub 7 to encircle the end of shaft 18, and a pin 41 extends through the cap 40 and shaft 18 to interlock the same for rotation. The pin 41 also serves to retain shaft 18 in its axial position so that clutch 39 is closed to effect driving of agitator shaft 14.

Where it is desired to avoid rotation of shaft 14 during transport of the spreader on wheels 8, pins 41 can be removed and then inserted transversely through the head of the corresponding cap 40 whereby the pins will ride in corresponding circumferential grooves 42 in the corresponding drive shafts 18. Each pin 41 is shown as having a head 43 and the pin may be retained in either position by a suitable cotter pin 44 or the like.

Each drive shaft 18 extends through the vertically open space within channel bracket 6 and through the corresponding end wall 5 of hopper 1.

When it is desired to remove one of the sections of agitator shaft 14, pin 41 is removed from cap 40 and drive shaft 18 is pulled outwardly by manual gripping of the T handle 45 on the outer end of the shaft, until clutch 39 is disengaged and the inner end of shaft 18 clears the sleeve 20. Thereupon the outer end of shaft 14 can be raised until it clears the top of end 5 of hopper 1. Removal of pin 22 will then permit the shaft 14 to be moved axially to slip sleeve 19 from the stub shaft 21 and allow clear removal of shaft 14.

During and following this operation there will be no contamination of the anti-friction bearing in unit 17 or of the journal bearing in hub 7 by fertilizer, lime or other material in hopper 1.

The section of shaft 14 may be re-assembled in the hopper 1 by first aligning it in tilted position with the corresponding stub shaft 21 and slipping sleeve 19 over the end of shaft 21, then lowering the outer end of shaft 14 into trough 2 and pushing drive shaft 18 into sleeve 20 until clutch 39 is engaged. Thereafter pins 22 and 41 can be inserted and secured in place. Any fertilizer, lime or other material which may get onto the end of either shaft 18 or of shaft 21 or into either sleeve 19 or 20 will not interfere with the assembly operation, and since these parts do not constitute rotary bearing surfaces, the effect of any such contamination will be inconsequential.

The invention provides a spreader in which the bearings for the agitator shaft may be adequately lubricated and the shaft may be removed at any time without contamination of the bearings by material within the hopper. Various modes of carrying out the invention may be employed within the scope of the accompanying claims which particularly point out and distinctly set forth the subject matter regarded as the invention.

I claim:

1. In a fertilizer spreader of the class described having a long narrow hopper with an agitator composed of two shaft sections lying end to end in the bottom of the hopper and extending inwardly from opposite ends of the hopper and with means to release the outer end of each said shaft section for raising and lowering thereof in removing and inserting the shaft sections, a central bearing unit supporting the inner ends of said agitator shaft sections and comprising a housing secured in said hopper and having spaced end walls, a bearing support for the corresponding shaft section in each of said end walls, and a pivotal mounting for each bearing in the corresponding wall of the housing to provide for angular tilting of the corresponding shaft section and bearing facilitating removal and insertion of the shaft section relative to the hopper.

2. In a fertilizer spreader of the class described having a long narrow hopper supported on end wheels and with wheel driven agitator shafts lying in the bottom of the hopper and extending inwardly from each end thereof, a support and drive for each said shaft comprising end stub shafts removably coupled to the opposite ends thereof, the stub shaft for supporting the inner end of each agitator shaft being rotatably mounted in a central sealed bearing unit in the hopper, and the stub shaft for supporting the outer end of each agitator shaft being rotatably mounted in a hollow stationary hub for the corresponding end wheel spaced outwardly from the end of the hopper, whereby said stub shafts remain in place and said bearings are protected against contamination by material within the hopper when the agitator shafts are removed.

3. A fertilizer spreader comprising a long narrow hopper adapted to contain material to be spread and having means for discharge of the material therefrom, a wheel at each end of the hopper for supporting the same, a bracket secured to each end of the hopper and carrying a hollow hub spaced from the corresponding end of the hopper, one of said wheels being mounted for rotation upon its associated hub, an agitator shaft within said hopper, a stub shaft journaled in said last mentioned hub and extending through the end of said hopper associated therewith, coupling means for removably clutching said shafts together to rotationally drive said agitator shaft by said stub shaft, means to disconnect said coupling by axial movement of said stub shaft outwardly of the hopper, the journal bearing for said stub shaft within said last mentioned hub being spaced from the hopper to prevent entrance of material from the hopper into the bearing during disconnection of said coupling, and means interlocking said wheel and stub shaft to secure the wheel in coupling relation to said agitator shaft and selectively drive said stub shaft from said one wheel.

4. The construction of claim 3 in which said last named means comprises a pin adapted to be inserted selectively in either of two positions, in one of which positions the pin interlocks the wheel and stub shaft both axially and rotationally, and in the other of which the pin interlocks the wheel and stub shaft only axially and leaves the wheel to turn free of said stub shaft, and removal of said pin from both positions permits disconnection of said shaft coupling.

5. In a fertilizer spreader of the class described, a long narrow hopper adapted to contain material to be spread and having an end wall, a bracket secured to the end of the hopper on the outside thereof, a hollow hub secured to said bracket and spaced from the end wall of said hopper, a wheel rotatably mounted on said hollow hub to support the end of the hopper, an agitator shaft extending longitudinally of and within said hopper with one end thereof extending through said end wall and journaled in said hub, said extending end of said shaft extending through said hub, and means at the outer end of said shaft free of said hub and securing said wheel to said shaft to rotate the latter as said wheel rotates, said spacing of said hollow hub from the end wall of said hopper providing a free drop to the ground for any fertilizer leaking through the end of the hopper adjacent said shaft and thereby protecting the bearing surfaces between said shaft and hub from entrance of fertilizer therebetween.

6. In a fertilizer spreader of the class described having a long narrow hopper with an agitator composed of two shaft sections lying end to end in the bottom of the hopper and extending inwardly from opposite ends of the hopper and with means to release the outer end of each said shaft section for raising and lowering thereof in removing and inserting the shaft section, a central bearing unit supporting the inner ends of said agitator shaft sections and comprising a sealed housing secured in said hopper and having spaced end walls, means partitioning said housing into two separate end chambers adapted to contain bearing lubricant, a bearing in each of said end walls for supporting the inner end of the corresponding shaft section, a pivotal mounting for each bearing in the corresponding end wall of the housing to provide for angular tilting of the corresponding shaft section and bearing facilitating removal and insertion of the shaft section relative to the hopper, and means to maintain the seal of each end wall against lubricant loss and contamination during operation and during said pivoting of the corresponding bearing.

7. In a fertilizer spreader of the class described having a long narrow hopper with an agitator composed of two shaft sections lying end to end in the bottom of the hopper and extending inwardly from opposite ends of the hopper and with means to release the outer end of each said shaft section for raising and lowering thereof in removing and inserting the shaft section, a stub shaft removably secured to the inner end of each agitator shaft section in axial alignment therewith and constituting a continuation thereof, an anti-friction bearing for each said stub shaft to thereby support the inner end of the corresponding agitator shaft section for rotation, and means pivotally supporting each said anti-friction bearing for tilting of the shaft section supported thereby to facilitate raising and lowering of the outer end of the shaft.

8. In a fertilizer spreader of the class described having a long narrow hopper with an agitator composed of two shaft sections lying end to end in the bottom of the hopper and extending inwardly from opposite ends of the hopper and with means to release the outer end of each said shaft sections for raising and lowering thereof in removing and inserting the shaft section, a stub shaft removably secured to the inner end of each agitator shaft section in axial alignment therewith and constituting a continuation thereof, a central bearing unit supporting said stub shafts and comprising a sealed housing secured in said hopper and having spaced end walls, means partitioning said housing into two separate end chambers adapted to contain bearing lubricant, and an anti-friction bearing in each of said end walls for supporting the corresponding stub shaft, said stub shaft remaining in place upon removal of the corresponding agitator shaft section and serving to close the corresponding lubricant chamber at all times.

9. In a fertilizer spreader of the class described having a long narrow hopper with an agitator composed of two shaft sections lying end to end in the bottom of the hopper and extending inwardly from opposite ends of the hopper and with means to release the outer end of each said shaft section for raising and lowering thereof in removing and inserting the shaft section, a central bearing unit supporting the inner ends of said agitator shaft sections and comprising a housing having spaced end walls, a bearing support for the corresponding shaft section in each of said end walls, and a pivotal mounting for each bearing in the corresponding wall of the housing to provide for angular tilting of the shaft section and bearing facilitating removal and insertion of the shaft section relative to the hopper, said pivotal mounting comprising inter-engaging outer bearing and housing members having complementary surfaces formed as a segment of a sphere with its center substantially at the geometric center of the bearing.

10. In a fertilizer spreader of the class described having a long narrow hopper with an agitator composed of two shaft sections lying end to end in the bottom of the hopper and extending inwardly from each end thereof and with means to release the outer end of each said shaft section for raising and lowering thereof in removing and inserting the shaft section, a stub shaft removably secured to the inner end of each agitator shaft section in axial alignment therewith and constituting a continuation thereof, a central bearing unit supporting said stub shafts and comprising a sealed housing secured in said hopper and having spaced end walls, means partitioning said housing into two separate end chambers adapted to contain bearing lubricant, an anti-friction bearing in each of said end walls for supporting the corresponding stub shaft, said stub shaft remaining in place upon removal of the corresponding agitator shaft section and serving to close the corresponding lubricant chamber at all times, and a pivotal mounting for each said bearing to provide for angular tilting of the corresponding shaft section and bearing, said pivotal mounting comprising inter-engaging outer bearing and housing members having complementary surfaces formed as a segment of a sphere with its center substantially at the geometric center of the bearing, and said mounting and bearing being supplied with lubricant from the corresponding end chamber.

11. In a fertilizer spreader of the class described having a long narrow hopper supported on end wheels and with wheel driven agitator shafts lying in the bottom of the hopper and extending inwardly from each end thereof, a support and drive for each said shaft comprising end stub shafts for the opposite ends thereof, means to couple each said stub shaft to the corresponding end of the agitator shaft, and means to interlock said coupled shafts for rotation in unison, the stub shaft for supporting the inner end of each agitator shaft being rotatably mounted in a central sealed bearing unit in the hopper, and the stub shaft for supporting the outer end of each agitator shaft being rotatably mounted in a hollow stationary hub for the corresponding end wheel spaced outwardly from the end of the hopper, whereby said bearings are protected against contamination by material within the hopper when the agitator shafts are removed.

12. A fertilizer spreader comprising a long narrow hopper adapted to contain material to be spread and having means for discharge of the material therefrom, a wheel at each end of the hopper for supporting the same, a bracket secured to each end of the hopper and carrying a hollow hub spaced from the end of the hopper, one of said wheels being mounted for rotation upon each said hub, an agitator shaft within said hopper, a stub shaft journaled in one of said hubs and extending through the associated end of said hopper, coupling means for removably clutching said shafts together to rotationally drive said agitator shaft by said stub shaft, means to disconnect said coupling by axial movement of said stub shaft outwardly of the hopper, the journal bearing for said stub shaft within said hub being spaced from the hopper to prevent entrance of material from the hopper into the bearing during disconnection of said coupling, and means interlocking said wheel and stub shaft to secure the wheel in coupling relation to said agitator shaft and selectively drive said stub shaft from the wheel, said last named means being disposed outwardly axially from the outer end of said hub and comprising a pin engaging selectively aligned recesses in a part of said wheel and in said stub shaft whereby when one set of recesses are alined and receive said pin the latter interlocks the wheel and stub shaft both axially and rotationally with the stub shaft coupled to said agitator shaft to rotate the same, and whereby when another set of recesses are alined and receive said pin the latter interlocks the wheel and stub shaft axially only, and whereby when said pin is removed said stub shaft may be moved outwardly of said hub to uncouple the same from said agitator shaft.

13. In a fertilizer spreader of the class described, a long narrow hopper adapted to contain material to be spread and having an end wall, a bracket secured to the end of the hopper on the outside thereof, a hollow hub secured to said bracket and spaced from the end wall of said hopper, a wheel rotatably mounted on said hollow hub to support the end of the hopper, an agitator shaft extending longitudinally of and within said hopper with one end thereof extending through said end wall and journaled in said hub, said extending end of said shaft extending through said hub, and means at the outer end of said shaft free of said hub and securing said wheel to said shaft to rotate the latter as said wheel rotates, said last named means being disposed outwardly axially from the outer end of said hub and comprising a pin engaging selectively aligned recesses in a part of said wheel and in said stub shaft whereby when one set of recesses are aligned and receive said pin the latter interlocks the wheel and stub shaft both axially and rotationally with the stub shaft coupled to said agitator shaft to rotate the same, and whereby when another set of recesses are aligned and receive said pin the latter interlocks the wheel and stub shaft axially only, and whereby when said pin is removed said stub shaft may be moved outwardly of said hub to uncouple the same from said agitator shaft.

References Cited in the file of this patent

UNITED STATES PATENTS

| | | |
|---|---|---|
| 2,213,432 | McCartney | Sept. 3, 1940 |
| 2,350,107 | Gandrud | May 30, 1944 |
| 2,533,386 | Masters | Dec. 12, 1950 |
| 2,612,788 | Christian | Oct. 7, 1952 |
| 2,626,729 | Ajero | Jan. 27, 1953 |